ROTARY HUMIDIFIER DRIVE

Original Filed May 15, 1967 2 Sheets-Sheet 1

INVENTOR
WALTER R. STILES

BY Strauch, Nolan, Neale, Nies & Kurz
ATTORNEYS

June 10, 1975 W. R. STILES Re. 28,445

ROTARY HUMIDIFIER DRIVE

Original Filed May 15, 1967 2 Sheets-Sheet 2

INVENTOR

WALTER R. STILES

BY Strauch, Nolan, Neale, Nies & Kurz

ATTORNEYS

United States Patent

Re. 28,445

Reissued June 10, 1975

28,445

ROTARY HUMIDIFIER DRIVE

Walter R. Stiles, Milford, Mich., assignor to Skuttle Mfg. Co., Milford, Mich.

Original No. 3,408,880, dated Nov. 5, 1968, Ser. No. 638,235, May 15, 1967, which is a continuation-in-part of abandoned application Ser. No. 578,364, Sept. 9, 1966. Application for reissue Apr. 18, 1974, Ser. No. 462,028

Int. Cl. F16h *57/00;* F24f *3/14*

U.S. Cl. 74—405 9 Claims

Matter enclosed in heavy brackets [ ] appears in the original patent but forms no part of this reissue specification; matter printed in italics indicates the additions made by reissue.

ABSTRACT OF THE DISCLOSURE

A rotary type humidifier having a water pick-up rotor peripherally carrying a removable sleeve of open pore polyurethane or equivalent is driven by a motor through reduction gearing, and the drive contains friction clutch means which is operative to transmit normal operational torques during operational rotor drive but slips to protect the gearing against injury when excessive torque is applied and resumes torque transmission automatically when the excess torque condition no longer prevails.

Related application

This is a continuation-in-part of my copending application Ser. No. 578,364, filed Sept. 9, 1966, for Rotary Humidifier Drive, now abandoned.

Background of invention

This invention relates to drive mechanism for rotary type humidifiers and it is particularly concerned with such mechanism wherein drive gearing between the motor and the rotor is automatically protected from injury due to excessive torque while the excess torque conditions prevail but resumes power transmission for normal operation.

Rotary humidifiers are known wherein the slowly turning rotor carries a removable sleeve of open pore material such as foamed polyurethane that picks up water from a reservoir during part of its revolution and permits evaporation of that water into a hot air stream during the remainder of the revolution.

These rotors are driven by a low power electric motor through a considerable drive reduction gear train to obtain very slow speeds of rotation of the rotor. It has been found that under some operational conditions, such as where the rotor becomes difficult to start turning due to crusted or accumulated deposits or when the sleeve is being removed from or replaced on the rotor in the assembly, the drive gearing may be accidentally stripped because of unintentionally applied excess torque. Also where some of the gearing is exposed within the humidifier casing it may be subject to rust or corrosion.

The invention prevents such injury to the drive gearing in such rotary humidifier by providing a slip clutch or the like in the drive which has the capacity of transmitting normal starting and driving torques but which is adapted to slip to interrupt power transmission when the torque exerted either by the motor trying to rotate the rotor, or by a person changing the rotor sleeve, becomes in excess of that for which the gears are designed, and it is the major object of this invention to provide the foregoing. This slip clutch may be incorporated in reduction gearing within the motor casing, or between the output shaft of the motor and reduction gearing unit and the rotor.

A further object of the invention is to provide, in a humidifier of the type wherein an electric motor is connected through a reduction gear train to a humidifier rotor, a novel gear and clutch arrangement that interrupts drive through the train when the transmitted torque exceeds a predetermined amount.

A further object of the invention is to provide a novel self-contained electric motor and gear reduction drive unit for a rotary humidifier wherein the unit contains a clutch preferably near the output end of the gearing.

Another object of the invention is to provide a novel slip clutch arrangement in a rotary humidifier drive.

Further objects of the invention will appear as the description proceeds in connection with the appended claims and the annexed drawings wherein:

Preferred embodiments

Figure 1:
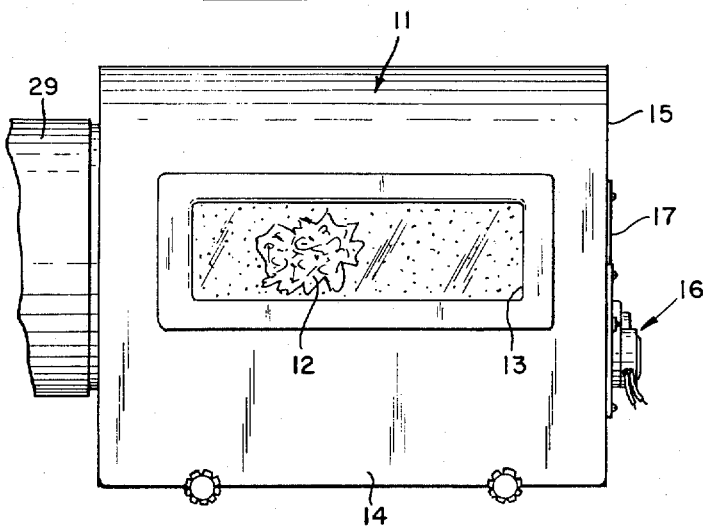
FIGURE 1 is a generally perspective view showing a humidifier assembly wherein one form of the invention is incorporated.

FIGURE 1 shows a rotary humidifier assembly 11 wherein the rotor 12 which is viewed through the transparent window 13 of the side cover 14 of housing 15 is driven by a drive motor assembly 16 attached to the side wall 17 of housing 15 as by screws 18. Assembly 16 consists essentially of an electric motor 19 and a reduction gear unit 21 in the same or rigidly connected casings, and an output shaft 22 that projects through the humidifier housing side wall (FIGURE 3).

Figure 3:
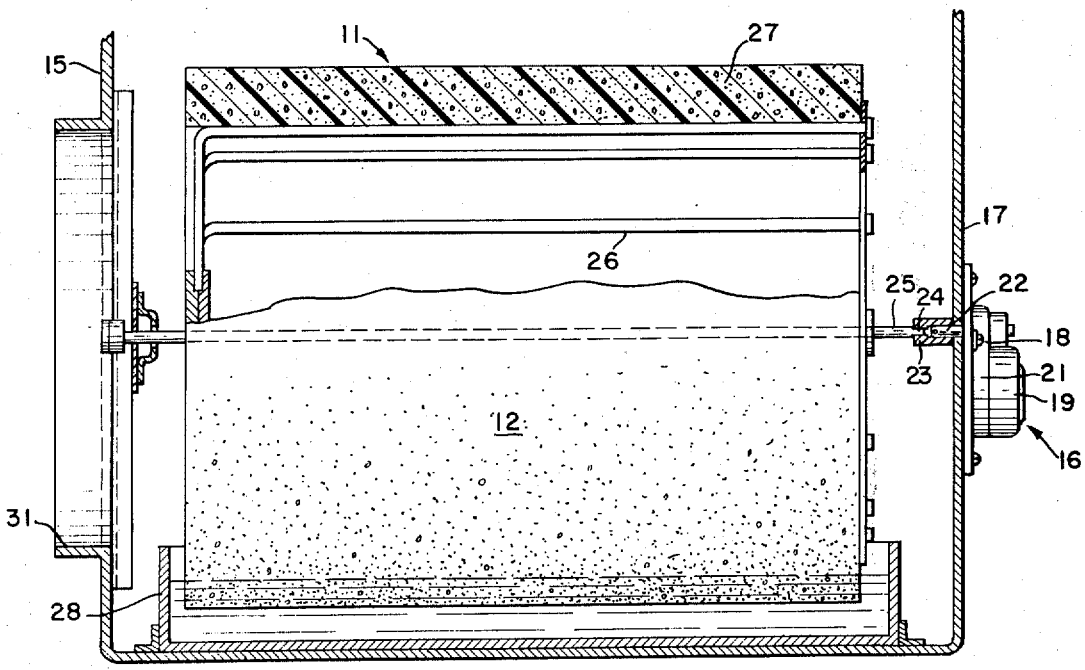
FIGURE 3 is a sectional view showing drive of the humidifier rotor of FIGURE 1 by the drive assembly of FIGURE 2.

As shown in FIGURE 3, shaft 22 where it projects within housing 15 has a coupling sleeve 23 fixed thereon as by a set screw, and sleeve 23 is non-rotatably connected as by an axial jaw clutch structure at 24 to the end of a coaxial horizontal shaft 25 of a cylindrical cage 26 on which is removably mounted a sleeve 27 of open pore plastic material such as foamed polyurethane which picks up but does not absorb water. The lower sector of sleeve 27 is disposed in a maintained level body of water in a pan or like container 28 whereby, as the rotor is rotated by the motor, the lower sector of the rotor moving through the water body continuously picks up water in its pores and this water is evaporated into the hot air stream that for example enters the humidifier through conduit 29 (FIGURE 1) and opening 31 (FIGURE 3) and after passing through the water laden upper part of the sleeve exits through the rear wall of housing 15 by a suitable opening (not shown) into a usual air duct.

Figure 2:
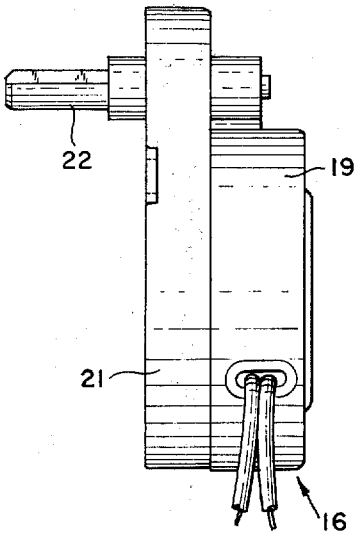
FIGURE 2 is a side elevation showing the driving motor and reduction gear unit assembly of FIGURE 1 for the humidifier rotor.
Figure 4:
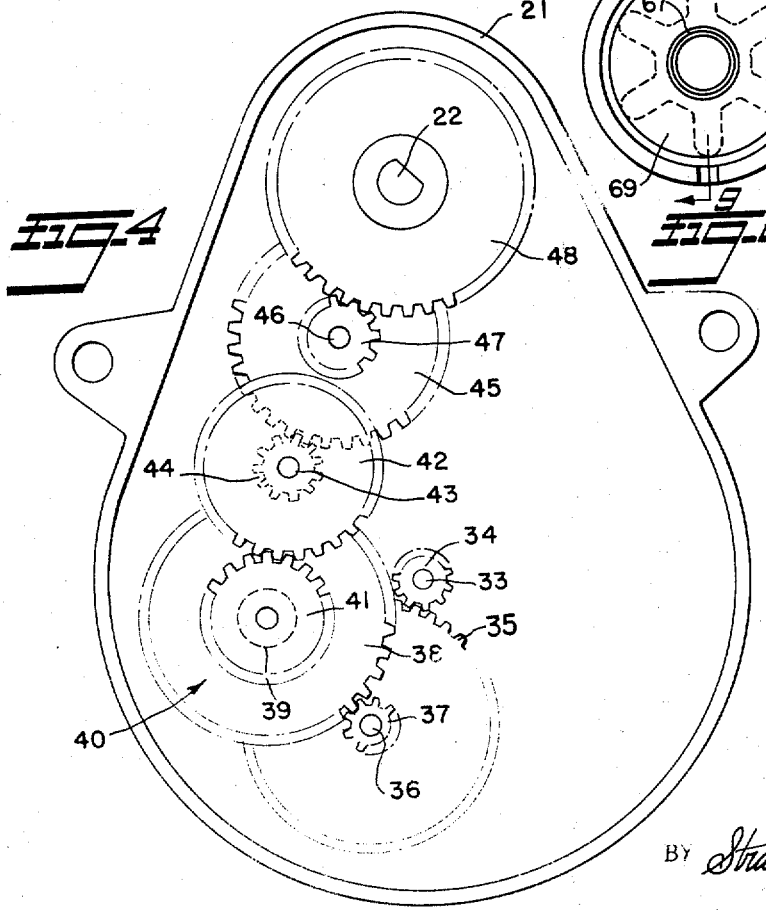
FIGURE 4 is an end elevation showing the gear reduction unit of FIGURE 2 with the cover removed to show the internal gear train and the clutch location.

Referring to FIGURES 2 and 4, the output shaft 33 of electric motor 19 which is essentially a conventional type of motor enters the casing of unit 21 and a pinion 34 is fixed thereto. Pinion 34 meshes with gear 35 on idler shaft 36 which has fixed thereto a pinion 37 meshed with gear 38 on idler shaft 39. Shaft 39 has a pinion 41 fixed on it meshed with a gear 42 on idler shaft 43, and shaft 43 has a pinion 44 fixed on it meshed with gear 45 fixed on idler shaft 36. A pinion 47 fixed on shaft 46 meshes with a gear 43 fixed on output shaft 22. The foregoing gear train provides a considerable speed reduction between the motor shaft 36 and output shaft 22, and through this gear reduction the rotor shaft 25 rotates at a desired very slow speed, such as about one revolution per minute for example. Idler shafts 36, 39, 43, and 46 and output shaft 22 are all journaled on parallel axes in suitable bearings in the casing (not shown).

Since operation of the humidifier of this type may be intermittent or randomly periodic, depending upon ambient humidity and automatic controls, the drive gearing between the motor 19 and rotor shaft 25 is subject to periodic starting and stopping. When the rotor starts, the lower sector is in the pan 28 and full of water and this requires a relatively high normal starting torque, and the fact that the weight distribution of the water in the rotor is unabalanced during normal rotation augments this condition, although once the rotor has settled to normal rotation the required torque reduces considerably. Under certain circumstances, such as where the rotor has been idle for some time, lime deposits or other encrustations may collect between the pan and the rotor, and the rotor may actually become jammed and considerably resist turning. This condition may result in damaging or even stripping the drive gears.

The sleeve 27 is removable endwise from the cage 26 for cleaning or replacement when the pores become clogged. At this time quite often the person removing or replacing the sleeve unintentionally subjects the rotor to torque that tends to turn the drive gear system reversely to normal operation. Since the motor for example may be designed to produce a torque of about 30–100 inch ounces, and the gears are so designed that it takes about 300 inch ounces torque to strip them, this manual turning of the motor may exceed that torque and strip or damage the drive gear train within the casing at 21.

The foregoing difficulties are eliminated by the invention whereby in the embodiment shown in FIGURES 1–6 one of the gears in the drive train is incorporated in a slip gear unit 40 combining a driven gear and a friction clutch which provides for slippage between the gear such as 38 and the associated pinion such as 41.

Figure 5:
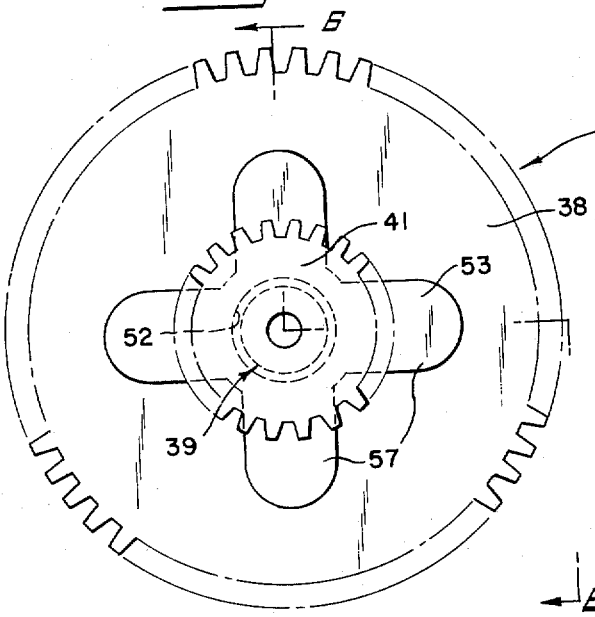
FIGURE 5 is a side elevation showing the clutch incorporated in a slip gear in the gear train of FIGURE 4.
Figure 6:
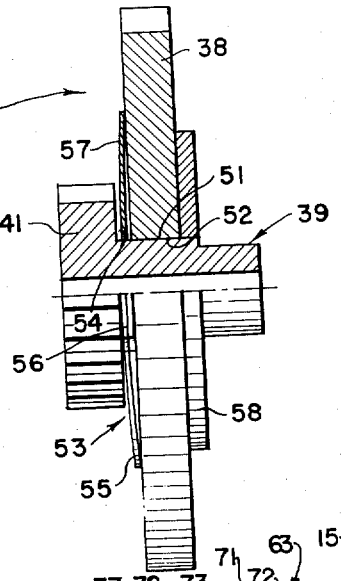
FIGURE 6 is a section substantially on line 6—6 of FIGURE 5.

Slip gear unit 40 as shown in FIGURES 5 and 6 comprises a special idler shaft 39 which is pinion 41 cut integrally thereon at one end and an adjacent cylindrical hub 51 that extends rotatably through the cylindrical center opening 52 of gear 38. The right-hand end of shaft 39 seats in a casing bearing. An annular dish-shaped metal plate spring 53 is compressed between one flat side 54 of pinion 41 and the adjacent parallel flat side 55 of gear 38. Spring 53 may be an annular plate with its inner and outer peripheries bearing on pinion 41 and gear 38 respectively, or as illustrated it may have a central annular region 56 frictionally bearing on pinion 41 with radially extending fingers 57 frictionally bearing on gear 38. A relatively stiff metal washer 58 is press fitted tightly onto hub 51 and it urges gear 38 against the outer periphery of spring 53 with sufficient force to compress the spring and thereby establish a predetermined slip clutch relationship between gear 38 and pinion 41. Should the torque sought to be transmitted through slip gear unit 40 in either direction exceed an allowable limit, such as about 200 inch ounces for the motor drive here involved, the friction clutch will slip to relieve the torque and the gear train in casing 21 will not be damaged.

As soon as the excess torque condition is no longer present, as when the sleeve has been replaced on the cage, or when the jamming or other force retarding normal drive of the rotor is removed, slip gear 40 automatically is in condition to transmit normal torque to drive the rotor.

The foregoing invention is of particular importance in rotary element humidifiers of the type wherein the rotating sleeve or other pad is an open pore plastic element made of foamed polyurethane and equivalent materials such as disclosed in U.S. Letters Patent No. 3,285,586 issued Nov. 15, 1966 to Milton A. Powers for Humidifier. The described starting and jamming loads are sometimes rather heavy, and the fore required to remove a sleeve is often considerable. Even under certain normal starting conditions, the clutch in the slip gear may slip somewhat so that the rotor starts rotating only very slowly but as soon as the condition is overcome the normal speed of rotation is established automatically.

A marked advantage of the invention also lies in the fact that the drive unit 15 may include relatively inexpensive gears that need not be built to withstand much more than normal expected drive torque. Also the motor and drive gearing in the invention are all contained in a single unit assembly 16 that is readily detached from the rotor shaft 25, and which eliminates the need for exposed reduction gears inside the humidifier housing itself. The entire gearing chain may be packed in lubricant so as to be protected against corrosion and require servicing only at widely spaced periods. The jaw catch at 24 enables removal of the rotor from the housing without disturbing the motor assembly 16.

Figure 8:
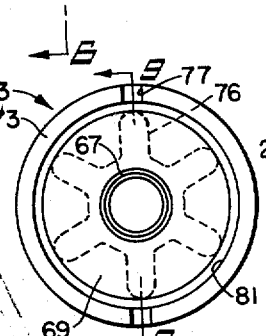
FIGURE 8 is an end view of the clutch of FIGURE 7 apart from the drive.
Figure 9:
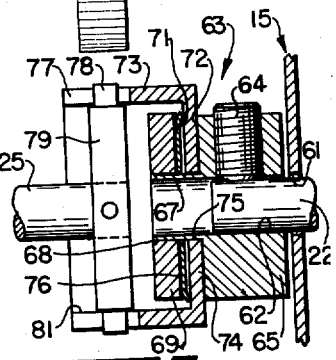
FIGURE 9 is a section through FIGURE 8 substantially on line 9—9 of FIGURE 8 showing clutch detail.
Figure 7:
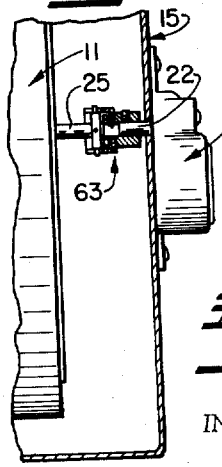
FIGURE 7 is a fragmentary view showing another embodiment of the invention wherein there is no clutch within the motor-gear casing and wherein a special slip clutch is connected between the motor output shaft and the rotor of the humidifier.

FIGURES 7–9 show a further embodiment of the invention wherein the clutch is located outside the motor casing and is disposed within the humidifier housing 15 to interconnect to output shaft 22 of the drive motor assembly 16' and the humidifier rotor shaft 25.

Motor assembly 16' is the same as motor assembly 16, except the clutch 40 is not included in the gearing between motor shaft 33 and output shaft 22. As shown in FIGURE 7, shaft 22 extends through an aperture 61 in the wall of housing 15 into the bore 62 of a clutch unit 63, and a set screw 64 fixes shaft 22 to hub 65 of the cluch unit. Hub 65 has a central projecting hollow post 67 upon the end of which is non-rotatably secured, as by staking over at 68, an annular flange 69 having a flat radial face 71 axially spaced from and parallel to similar flat radial face 72 on the hub.

A cup-shaped coupling collar 73 surrounds flange 69 and is provided with a flat surfaced internal flange 74 extending into the space between hub faces 71 and 72 where its central opening 75 rotatably surrouds post 67. A bowed annular plate spring 76 on post 67 is compressed axially between hub flange 69 and collar flnage 74, whereby the collar is resiliently frictionally engaged in driving relation with hub 65.

Collar 73 has diametrically opposed open end drive slots 77 that receive drive lugs 78 on a ring 79 that axially slidably fits within the bore 81 of collar 73. Ring 79 is fixed or integral with the adjacent end of rotor shaft 25, so that the clutch unit 63 not only drive connects shafts 22 and 25 but it also supports one end of the humidifier unit 11.

Clutch unit 63 performs essentially the same as clutch unit 49 in providing normal drive of the humidifier rotor, but slipping to interrupt the drive and thereby protect the gearing in the casing at 16' when excess torque conditions prevail.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a humidifier assembly of the type wherein a water pick-up rotor [having] *consisting essentially of skeleton frame means and an annular flexible sleeve or porous synthetic plastic material mounted on said frame means with its* lower portion extending into a body of water is driven from a motor through a drive line containing a train of speed reduction gearing *and said rotor is rotatably supported on coaxial shaft means projecting from opposite ends of said rotor* the improvement which comprises a normally engaged slip clutch unit in said drive line *connected between the output side of said train of gearing and one of said shaft means* adapted to slip and interrupt power transmission therethrough when subjected to torque in either direction of rotation in excess of a predetermined amount and to automatically resume power transmission when such excess torque condition does not prevail.

2. In the humidifier assembly defined in claim 1, said clutch unit [being connected between] *comprising coaxial clutch elements connected for relative rotation under excess torque conditions and secured respectively to* the output side of said train of gearing and [a] *said* shaft *means* [*carrying said rotor*].

3. In the humidifier assembly defined in claim [2] *1*, said said clutch unit comprising a hub affixed to [the] *an* output shaft of said gearing, a collar axially slidably coupled to said rotor shaft *means*, and a resiliently biased friction drive connection between said hub and the collar.

4. In the humidifier assembly defined in claim 1, said rotor being enclosed within a housing and supported on a rotatable horizontal shaft therein, said motor and gearing being enclosed in casing means externally mounted on the housing with an output shaft projecting through the housing wall coaxially with said rotor shaft, and said clutch unit being an axially separable clutch *within* said housing between said shafts.

5. In the humidifier assembly defined in claim 1, said slip clutch being incorporated in a slip gear unit that consists essentially of an idler shaft upon which a pinion element and a gear element of said train are mounted for relative rotation and resilient friction means compressed between said elements.

6. In the humidifier assembly defined in claim 1, said motor and train of gearing being enclosed in a self-contained unit having an output shaft connected directly to said [rotor] *slip clutch unit.*

7. In a humidifier assembly of the type wherein a water pick-up rotor having a lower portion extending into a body of water is driven from a motor through a drive line containing a train of speed reduction gearing, the improvement which comprises a friction clutch unit in said drive line connected between the output side of said train of gearing and a shaft carrying said rotor adapted to slip and interrupt power transmission therethrough when subjected to torque in either direction of rotation in excess of a predetermined amount and to automatically resume power transmission when such excess torque condition does not prevail, said clutch unit comprising a hub affixed to the output shaft of said gearing, a collar axially slidably coupled to said rotor shaft, and a resiliently biased friction drive connection between said hub and the collar, and said hub having axially spaced surfaces defining a space receiving an internal flange on said collar, there being a spring in said space urging the collar flange into frictional engagement with one of said surfaces.

8. In a humidifier assembly of the type wherein a water pick-up rotor having a lower portion extending into a body of water is driven from a motor through speed reduction gearing and said rotor is enclosed within a housing and supported on a rotatable horizontal shaft therein, the improvement which comprises casing means externally mounted on said housing enclosing said motor and gearing, an output shaft projecting from said casing through the housing wall coaxially with said rotor shaft, and a friction clutch unit comprising an axially separable clutch within said housing connected between said shafts and supporting one end of the rotor within the housing, said friction clutch unit being adapted to slip and interrupt power transmission when subjected to torque in either direction of rotation in excess of a predetermined amount and to automatically resume power transmission when such excess torque condition does not prevail.

9. In a humidifier assembly of the type wherein a water pick-up rotor having a lower portion extending into a body of water is driven from a motor through speed reduction gearing and said rotor is enclosed within a housing and supported on a rotatable horizontal shaft therein, the improvement which comprises a motor and gear reduction unit mounted on said housing, an output shaft projecting from said unit coaxially with said rotor shaft, and a slip clutch unit within said housing connected between said shafts and supporting one end of the rotor within the housing, said slip clutch unit being adapted to slip and interrupt power transmission when subjected to torque in either direction of rotation in excess of a predetermined amount and to automatically resume power transmission when such excess torque condition does not prevail.

References Cited

The following references, cited by the Examiner, are of record in the patented file of this patent on the original patent.

UNITED STATES PATENTS

| | | | |
|---|---|---|---|
| 2,117,873 | 5/1938 | Borgfeldt | 74—405 X |
| 2,682,779 | 7/1954 | Stein et al. | 74—411 |
| 2,774,252 | 12/1956 | Meyer | 74—411 X |
| 2,939,330 | 6/1960 | Margetts | 74—411 |
| 2,952,146 | 9/1960 | Bruck | 64—30 C |
| 2,973,659 | 3/1961 | Gallagher et al. | 74—405 |
| 3,021,831 | 2/1962 | Byrge | 126—113 |
| 3,105,371 | 10/1963 | Forrest | 64—30 C |
| 3,149,626 | 9/1964 | Wentling et al. | 126—113 |
| 3,203,268 | 8/1965 | Manoni et al | 74—411 |

LEONARD H. GERIN, Primary Examiner

U.S. Cl. X.R.

64—30 C; 74—411; 126—113